United States Patent
Sato et al.

(10) Patent No.: US 7,923,945 B2
(45) Date of Patent: Apr. 12, 2011

(54) VOLTAGE CONTROL OF UPCONVERTER IN A MOTORED VEHICLE DRIVE

(75) Inventors: Ryoji Sato, Toyohashi (JP); Takashi Yamashita, Nagoya (JP)

(73) Assignees: Toyota Jidosha Kabushiki Kaisha, Toyota (JP); Denso Corporation, Kariya (JP)

( * ) Notice: Subject to any disclaimer, the term of this patent is extended or adjusted under 35 U.S.C. 154(b) by 580 days.

(21) Appl. No.: 11/918,230

(22) PCT Filed: May 19, 2006

(86) PCT No.: PCT/JP2006/310515
§ 371 (c)(1),
(2), (4) Date: Oct. 11, 2007

(87) PCT Pub. No.: WO2006/123843
PCT Pub. Date: Nov. 23, 2006

(65) Prior Publication Data
US 2009/0033257 A1 Feb. 5, 2009

(30) Foreign Application Priority Data
May 20, 2005 (JP) .................................. 2005-148220

(51) Int. Cl.
*H02P 1/00* (2006.01)
(52) U.S. Cl. ......... 318/139; 318/800; 318/801; 318/268
(58) Field of Classification Search .................. 318/139, 318/800, 801, 254.1, 268; 180/65.1–65.7, 180/337, 338, 343, 347
See application file for complete search history.

(56) References Cited

U.S. PATENT DOCUMENTS

| | | | |
|---|---|---|---|
| 4,816,985 A | 3/1989 | Tanahashi | |
| 5,796,224 A * | 8/1998 | Hayashi et al. | 318/139 |
| 5,883,484 A | 3/1999 | Akao | |
| 5,884,201 A | 3/1999 | Kawai | |
| 5,951,614 A | 9/1999 | Tabata et al. | |
| 5,969,624 A * | 10/1999 | Sakai et al. | 340/636.1 |
| 6,060,859 A * | 5/2000 | Jonokuchi | 318/801 |
| 6,262,545 B1 * | 7/2001 | Yamamoto | 318/400.2 |
| 6,629,027 B2 | 9/2003 | Yamaguchi et al. | |
| 6,659,213 B2 * | 12/2003 | Kubo et al. | 180/65.26 |

(Continued)

FOREIGN PATENT DOCUMENTS

EP 1 500 549 A2 1/2005

(Continued)

OTHER PUBLICATIONS

Oct. 28, 2009 Office Action issued in Korean Patent Application No. 10-2007-7029663 (with translation).

(Continued)

*Primary Examiner* — Walter Benson
*Assistant Examiner* — Thai Dinh
(74) *Attorney, Agent, or Firm* — Oliff & Berridge, PLC

(57) ABSTRACT

When an ECU receives a transmission signal having a high level from a transmission, the ECU exerts torque reduction control to reduce a torque control value for a motor generator. Furthermore the ECU sets an optimum (or target) value of a voltage as based on the torque control value and a motor rotation speed and controls an upconverter. Herein, when the transmission is shifting gears, the ECU controls the upconverter to allow the voltage to be constant regardless of whether the torque reduction control is exerted to reduce the torque control value.

17 Claims, 10 Drawing Sheets

U.S. PATENT DOCUMENTS

| | | | |
|---|---|---|---|
| 6,727,599 B2 * | 4/2004 | Schlangen | 290/40 B |
| 6,870,336 B2 * | 3/2005 | Murakami et al. | 318/432 |
| 6,923,279 B2 * | 8/2005 | Shimane et al. | 180/65.1 |
| 2003/0081440 A1 * | 5/2003 | Komatsu et al. | 363/132 |

FOREIGN PATENT DOCUMENTS

| | | |
|---|---|---|
| JP | A-05-292603 | 11/1993 |
| JP | A-06-107042 | 4/1994 |
| JP | A-08-168110 | 6/1996 |
| JP | A-08-336205 | 12/1996 |
| JP | A-10-066383 | 3/1998 |
| JP | A-10-66383 | 3/1998 |
| JP | A-2000-006690 | 1/2000 |
| JP | A-2001-008315 | 1/2001 |
| JP | A-2002-225578 | 8/2002 |
| JP | A-2003-118434 | 4/2003 |
| JP | A-2003-127681 | 5/2003 |
| JP | A-2004-203218 | 7/2004 |
| JP | A-2004-208409 | 7/2004 |

OTHER PUBLICATIONS

Apr. 9, 2010 Office Action (Notice of Allowance) issued in corresponding Korean Application No. 10-2007-7029663 (with translation).

Jun. 29, 2010 Decision to Grant Patent issued in corresponding Japanese Application No. 2005-148220 (with translation).

* cited by examiner

VOLTAGE CONTROL OF UPCONVERTER IN A MOTORED VEHICLE DRIVE

TECHNICAL FIELD

The present invention relates generally to load drive apparatuses and motored vehicles having the same mounted thereon, and particularly to load drive apparatuses including an upconverter upconverting a direct current voltage received from a direct current power supply and motored vehicles having the same mounted thereon.

BACKGROUND ART

In recent years, as environmental issues, energy issues and other similar issues are addressed, hybrid vehicles, electric vehicles, fuel cell vehicles and other similar motored vehicles are gaining attention. These motored vehicles have a direct current power supply implemented by a secondary battery or a fuel cell, an inverter and a motor driven by the inverter as a power source.

Japanese Patent Laying-Open No. 2004-203218 discloses a control device that is provided in a motored vehicle provided with a transmission between a motor generating driving force and an output member and corrects a torque output of the motor when the transmission is shifting gears. When the transmission is shifting gears, the control device corrects the torque of the motor in a direction that suppresses variation of the torque of the output member to prevent the torque of an output shaft from dropping as the transmission shifts gears.

Furthermore, as motors increasingly provide larger outputs, the above described motored vehicle is also known that is provided with an upconverter receiving direct current voltage from a direct current power supply to upconvert the received voltage to supply the upconverted voltage to an inverter.

Japanese Patent Laying-Open No. 2004-208409 discloses a vehicular power control device including such an upconverter. The vehicular power control device includes a driving, rotating electric machine, an inverter circuit driving the driving, rotating electric machine, and a DC-DC converter receiving voltage from a battery to upconvert the received voltage to supply the inverter circuit with the upconverted voltage. This vehicular power control device can reduce an up-conversion ratio of the DC-DC converter in accordance with the electric power consumption of the driving, rotating electric machine in driving the driving, rotating electric machine with small electric power. The vehicular power control device can thus reduce a loss in a circuit.

If a motored vehicle provided with a transmission between a motor generating driving force and a driving wheel is provided between a direct current power supply and an inverter with an upconverter outputting a voltage, which corresponds to that input to the inverter, controlled in accordance with the output of the motor, and as the transmission shifts gears, the output of the motor abruptly varies and accordingly the voltage output from the upconverter, i.e., that input to the inverter, is modified, then, for some motor control modes, there is a possibility that the motor is unstably controlled.

When the transmission is shifting gears, the transmission has a friction element re-engaged and accordingly the motor rotates at an increased rate. If this is prevented by exerting control to temporarily decrease a torque output of the motor when the transmission is shifting gears, (hereinafter also referred to as "torque reduction control"), then when the transmission is shifting gears, the motor provides an output decreasing and increasing (or recovering) for the former and latter halves, respectively, of shifting gears, and modifying the voltage output from the upconverter, i.e., that input to the inverter as the output of the motor abruptly varies when the transmission is shifting gears, allows the inverter to receive a voltage decreasing for the former half of shifting gears as the output of the motor decreases and increasing for the latter half of shifting gears as the output of the motor increases. Note that if the motor is controlled in a rectangular-wave control mode, which has a larger interval in timing to control the motor than a PWM control mode and is based on that the inverter receives constant voltage, the switching operation in the inverter cannot follow the abrupt variation in the voltage input and the motor is unstably controlled.

DISCLOSURE OF THE INVENTION

Accordingly the present invention has been made to overcome such disadvantage and it contemplates a load drive apparatus that allows a motor to be stably controlled when a transmission is shifting gears in a motored vehicle provided with the transmission at an output shaft of the motor and also provided with an upconverter.

Furthermore the present invention also contemplates a motored vehicle that is provided with a transmission at an output shaft of a motor and also provided with an upconverter and that has a load drive apparatus mounted thereon to allow the motor to be stably controlled when the transmission is shifting gears.

In accordance with the present invention a load drive apparatus is a load drive apparatus of a motored vehicle having a transmission between a motor generating force driving the vehicle and a driving wheel of the vehicle, and includes: a drive device driving the motor; an upconverter receiving direct current voltage from a direct current power supply to upconvert the direct current voltage and supply the upconverted voltage to the drive device; and an up-conversion control portion setting the upconverted voltage and controlling the upconverter to generate the upconverted voltage set, wherein the up-conversion control portion sets the upconverted voltage at a constant value when the transmission is shifting gears.

The present load drive apparatus sets the upconverted voltage to have a constant value when the transmission is shifting gears. As such, if the transmission is shifting gears, and the output of the motor abruptly changes, the motor will nonetheless not be controlled unstably.

Thus the present load drive apparatus allows the motor to be stably controlled when the transmission is shifting gears.

Preferably the up-conversion control portion sets the upconverted voltage when the transmission is shifting gears, the upconverted voltage being an upconverted voltage assumed when the transmission starts to shift gears.

Preferably the drive device has a rectangular-wave control mode as a control mode applied to control the motor.

The present load drive apparatus can fix the upconverted voltage when the transmission is shifting gears. As such, if the transmission is shifting gears, and the output of the motor abruptly varies, and furthermore, the motor is currently controlled in the rectangular-wave control mode, the motor will nonetheless not be controlled unstably. Thus the present load drive apparatus allows the motor to be stably controlled when the transmission is shifting gears.

Furthermore in accordance with the present invention a load drive apparatus is a load drive apparatus of a motored vehicle having a transmission between a motor generating force driving the vehicle and a driving wheel of the vehicle, and includes: a drive device driving the motor; an upconverter receiving direct current voltage from a direct current power supply to upconvert the direct current voltage and supply the upconverted voltage to the drive device; an up-conversion control portion setting the upconverted voltage, as based on an output of the motor, and controlling the upconverter to generate the upconverted voltage set; and a torque control portion controlling the drive device to reduce a torque output of the motor when the transmission is shifting gears, wherein the up-conversion control portion controls the upconverter to prevent the up-converted voltage from decreasing when the transmission is shifting gears as the torque control portion reduces the torque output of the motor.

When the transmission is shifting gears, the transmission has a friction element re-engaged and accordingly the motor rotates at an increased rate. To prevent this, the torque output of the motor is reduced. In the present load drive apparatus, the up-conversion control portion controls the upconverter to prevent the up-converted voltage from decreasing when the transmission is shifting gears as the torque output of the motor decreases. This suppresses abrupt variation of the upconverted voltage, and the motor will not be controlled unstably.

Thus the present load drive apparatus allows the motor to be stably controlled when the transmission is shifting gears.

Preferably the up-conversion control portion sets the upconverted voltage at a constant value when the transmission is shifting gears.

Still preferably the up-conversion control portion sets the upconverted voltage when the transmission is shifting gears, the upconverted voltage being an upconverted voltage assumed when the transmission starts to shift gears.

Still preferably the up-conversion control portion sets the upconverted voltage when the transmission is shifting gears, the upconverted voltage being a controllable, maximum voltage.

Preferably drive device has a rectangular-wave control mode as a control mode applied to control the motor.

The present load drive apparatus can prohibit the upconverted voltage from decreasing when the transmission is shifting gears as the torque output of the motor decreases. As such, if the motor is currently controlled in the rectangular-wave control mode, the motor will not be controlled unstably. Thus the present load drive apparatus allows the motor to be stably controlled when the transmission is shifting gears.

Furthermore in accordance with the present invention a motored vehicle includes: a motor generating force driving the vehicle; a transmission provided between the motor and a driving wheel of the vehicle; and the load drive apparatus as described above.

The present vehicle includes the load drive apparatus as described above. As such, when the transmission is shifting gears, and the output of the motor abruptly varies, the motor will nonetheless not be controlled unstably. Thus the present vehicle allows the motor to be stably controlled when the transmission is shifting gears.

Thus in accordance with the present invention the motored vehicle that is provided with a transmission at an output shaft of a motor and is also provided with an upconverter, and the load drive apparatus mounted in the motored vehicle, allow the motor to be stably controlled when the transmission is shifting gears.

BEST MODES FOR CARRYING OUT THE INVENTION

Hereinafter the present invention in embodiments will be described more specifically with reference to the drawings. In the figures, identical or corresponding portions are identically denoted and will not be described repeatedly.

First Embodiment

Figure 1:
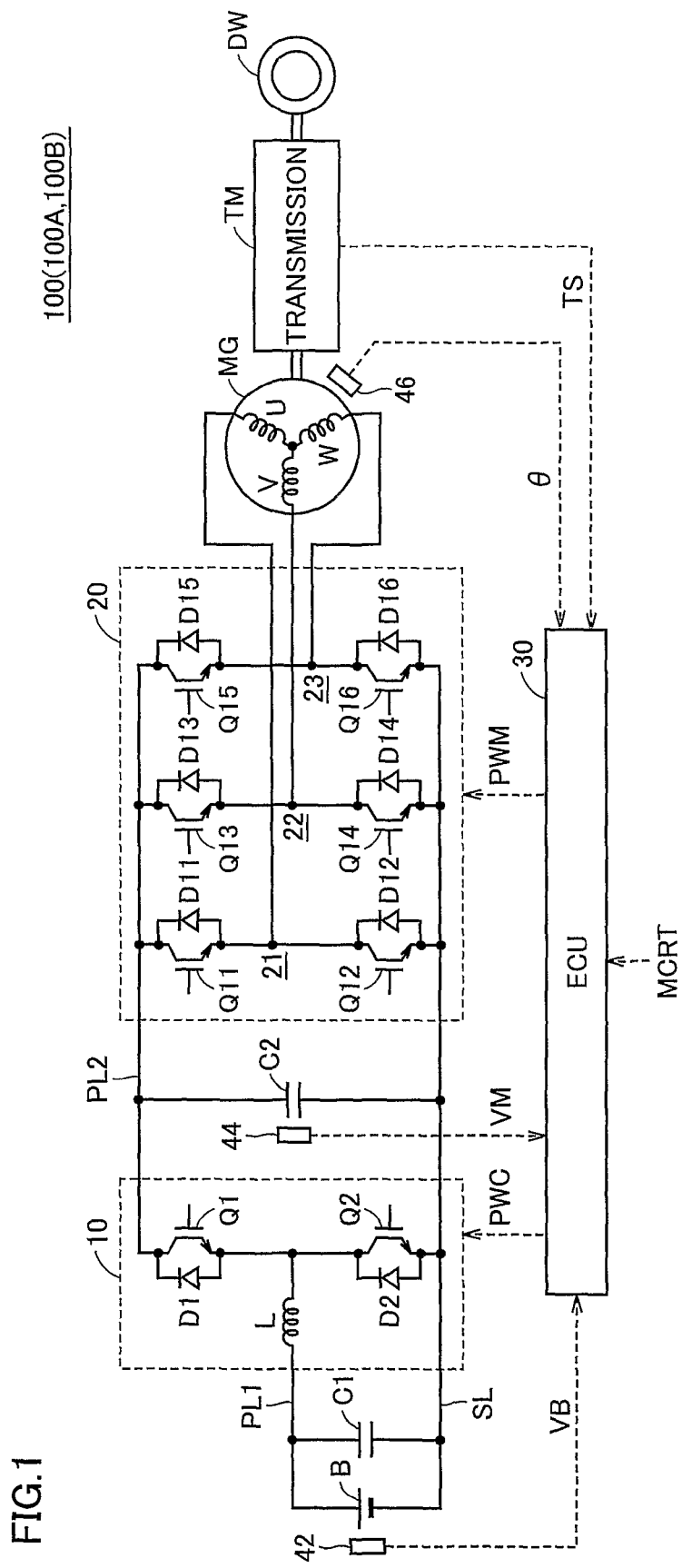
FIG. 1 is a block diagram generally showing a motored vehicle in a first embodiment of the present invention.

FIG. 1 is a block diagram generally showing a motored vehicle in a first embodiment of the present invention. With reference to FIG. 1, a motored vehicle 100 includes a battery B, an upconverter 10, an inverter 20, an electronic control unit (ECU) 30, a motor generator MG, a transmission TM, a driving wheel DW, capacitors C1 and C2, voltage sensors 42 and 44, a position sensor 46, power supply lines PL1 and PL2, and a ground line SL.

Battery B has a positive electrode connected to power supply line PL1 and a negative electrode connected to ground line SL. Capacitor C1 is connected between power supply line PL1 and ground line SL.

Upconverter 10 includes a reactor L, power transistors Q1 and Q2, and diodes D1 and D2. Reactor L has one end connected to power supply line PL1 and the other end connected to a point connecting power transistors Q1 and Q2. Power transistors Q1 and Q2 are connected in series between power supply line PL2 and ground line SL. Between the collector and emitter of power transistor Q1, diode D1 is connected to pass a current from the emitter to the collector, and between the collector and emitter of power transistor Q2, diode D2 is connected to pass a current from the emitter to the collector.

Capacitor C2 is connected between power supply line PL2 and ground line SL. Inverter 20 includes a U-phase arm 21, a V-phase arm 22 and a W-phase arm 23 connected in parallel between power supply line PL2 and ground line SL. U-phase arm 21 is formed of series-connected power transistors Q11 and Q12. V-phase arm 22 is formed of series-connected power transistors Q13 and Q14. W-phase arm 23 is formed of series-connected power transistors Q15 and Q16. Between the collector and emitter of power transistor Q11 a diode D11 is connected to pass a current from the emitter to the collector. Between the collector and emitter of power transistor Q12 a diode D12 is connected to pass a current from the emitter to the collector. Between the collector and emitter of power transistor Q13 a diode D13 is connected to pass a current from the emitter to the collector. Between the collector and emitter of power transistor Q14 a diode D14 is connected to pass a current from the emitter to the collector. Between the collector and emitter of power transistor Q15 a diode D15 is connected to pass a current from the emitter to the collector. Between the collector and emitter of power transistor Q16 a diode D16 is connected to pass a current from the emitter to the collector. The points connecting the power transistors in the U-, V-, and W-phase arms are connected to the ends of U-, V- and W-phase coils, respectively, of motor generator MG that are farther from the neutral point of the U-, V- and W-phase coils.

Motor generator MG has an output shaft with transmission TM connected thereto, and transmission TM has an output shaft with driving wheel DW linked thereto.

Battery B is a direct current power supply. For example, it is implemented by a nickel metal hydride, lithium ion or similar secondary battery, a fuel cell or the like. Battery B generates and outputs direct current voltage to upconverter 10.

Capacitor C1 smoothes variation in voltage between power supply line PL1 and ground line SL. Voltage sensor 42 detects a voltage VB output from battery B and outputs the detected voltage VB to ECU 30. Voltage sensor 44 detects a voltage between terminals of capacitor C2, i.e., a voltage VM output from upconverter 10, which corresponds to a voltage input to inverter 20, which will also be applied hereinafter, and voltage sensor 44 outputs the detected voltage VM to ECU 30.

Upconverter 10 operates in response to a signal PWC received from ECU 30 to upconvert, using reactor L, the direct current voltage received from battery B and supplies the upconverted voltage to power supply line PL2. More specifically, upconverter 10 operates in response to signal PWC received from ECU 30 to upconvert the direct current voltage received from battery B by storing to reactor L as magnetic-field energy the current flowing as power transistor Q2 operates to switch, and upconverter 10 outputs the upconverted voltage through diode D1 to power supply line PL2 in synchronization with a time at which power supply transistor Q2 is turned off.

Capacitor C2 smoothes variation in voltage between power supply line PL2 and ground line SL. Inverter 20 operates in response to a signal PWM received from ECU 30 to convert direct current voltage received on power supply line PL2 to 3-phase alternate current voltage and output the 3-phase alternate current voltage to motor generator MG. Motor generator MG is thus driven to generate a torque designated by a torque control value.

Motor generator MG generates a torque driving the vehicle on the 3-phase alternate current voltage received from inverter 20 and outputs the generated driving torque to transmission TM. Position sensor 46 detects a position θ of a rotor of motor generator MG assumed as it rotates, and outputs to ECU 30 a value representing the detected position.

Transmission TM shifts an output received from motor generator MG and outputs the shifted output to driving wheel DW. Furthermore, when transmission TM is shifting gears, transmission TM generates a transmission signal TS having a high level indicating that transmission TM is shifting gears, and transmission TM outputs the generated transmission signal TS to ECU 30.

ECU 30 calculates a torque control value TR for motor generator MG in accordance with the power required for the vehicle. Herein, when ECU 30 receives transmission signal TS having the high level from transmission TM, ECU 30 decreases torque control value TR for motor generator MG, i.e., exerts the torque reduction control.

Furthermore, ECU 30 generates signal PWC, as based on torque control value TR, voltages VB and VM received from voltage sensors 42 and 44 and a motor rotation speed calculated from position θ received from position sensor 46, for driving upconverter 10 and outputs the generated signal PWC to upconverter 10. Herein, while ECU 30 receives transmission signal TS having the high level from transmission TM as transmission TM is shifting gears, whether or not the torque reduction control may be exerted to reduce torque control value TR, ECU 30 generates signal PWC to allow up converter 10 to output voltage (VM) that is constant, and outputs the generated signal PWC to upconverter 10.

Furthermore, ECU 30 generates signal PWM, as based on torque control value TR, voltage VM and a motor current MCRT of motor generator MG, for driving motor generator MG, and outputs the generated signal PWM to inverter 20. Note that motor current MCRT is detected by a current sensor (not shown).

Figure 2:
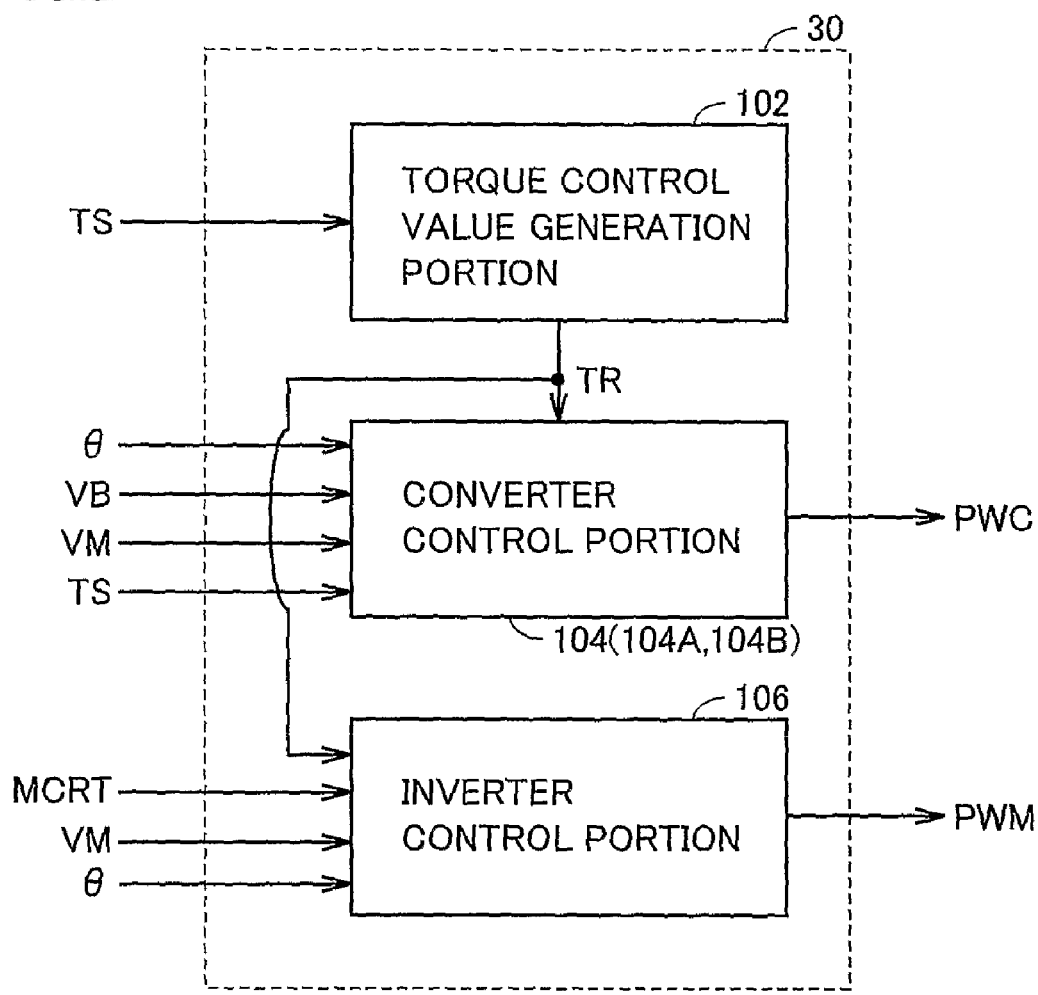
FIG. 2 is a functional block diagram of the ECU shown in FIG. 1.

FIG. 2 is a functional block diagram of ECU 30 shown in FIG. 1. With reference to FIG. 2, ECU 30 includes a torque control value generation portion 102, a converter control portion 104, and an inverter control portion 106. Torque control value generation portion 102 calculates, as based for example on a position of an accelerator pedal, a torque control value TR for motor generator MG that is required to attain power required.

Herein, when torque control value generation portion 102 is receiving transmission signal TS having the high level from transmission TM, i.e., transmission TM is shifting gears, torque control value generation portion 102 reduces torque control value TR for motor generator MG. This is done in order to prevent motor generator MG from having a rate of ration increasing as transmission TM shifting gears has a friction element re-engaged.

Converter control portion 104 generates signal PWC, as based on torque control value TR received from torque control value generation portion 102, a motor rotation speed calculated from position θ received from position sensor 46 and voltages VB and VM received from voltage sensors 42 and 44, in a method as described later, for turning on and off power transistors Q1 and Q2 of upconverter 10, and outputs the generated signal PWC to upconverter 10.

Herein, when converter control portion 104 is receiving transmission signal TS having the high level from transmission TM, i.e., transmission TM is shifting gears, whether or not torque control value generation portion 102 may output a reduced torque control value TR, converter control portion 104 generates signal PWC to allow upconverter 10 to output an upconverted voltage (i.e., voltage VM) that is constant.

Inverter control portion 106 generates signal PWM, as based on torque control value TR received from torque control value generation portion 102, motor current MCRT and voltage VM, for turning on and off power transistors Q11-Q16 of inverter 20, and outputs the generated signal PWM to inverter 20.

Figure 3:
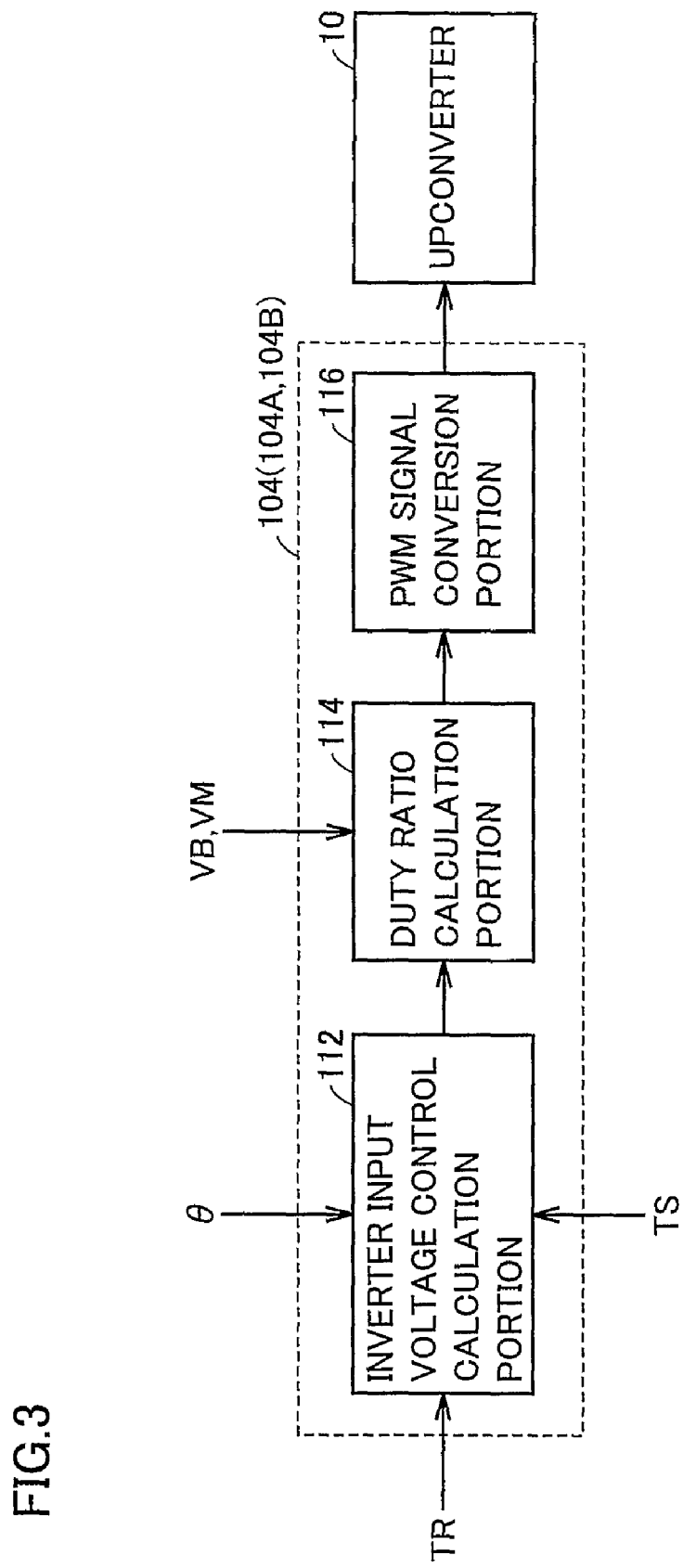
FIG. 3 is a functional block diagram specifically showing the converter control portion shown in FIG. 2.

FIG. 3 is a functional block diagram specifically showing converter control portion 104 shown in FIG. 2. With reference to FIG. 3, converter control portion 104 includes an inverter input voltage control calculation portion 112, a duty ratio calculation portion 114, and a PWM signal conversion portion 116.

Inverter input voltage control calculation portion 112 calculates, as based on an output of motor generator MG, i.e., torque control value TR received from torque control value generation portion 102 (not shown) and a motor rotation speed calculated from position θ received from position sensor 46, an optimum (or target) value of the voltage input to the inverter, i.e., an inverter input voltage control value Vcom, and outputs the calculated inverter input voltage control value Vcom to duty ratio calculation portion 114.

Herein when inverter input voltage control calculation portion 112 is receiving transmission signal TS having the high level from transmission TM (not shown), inverter input voltage control calculation portion 112 sets inverter input voltage control value Vcom at the immediately previously calculated value. More specifically, when transmission TM is shifting gears, inverter input voltage control calculation portion 112 fixes inverter input voltage control value Vcom at a value assumed when the transmission starts to shift gears.

Duty ratio calculation portion 114 calculates a duty ratio as based on inverter input voltage control value Vcom received from inverter input voltage control calculation portion 112 and voltages VB and VM received from voltage sensors 42 and 44 for controlling a voltage input to inverter 20 to be inverter input voltage control value Vcom and outputs the calculated duty ratio to PWM signal conversion portion 116.

PWM signal conversion portion 116 generates signal PWC as based on the duty ratio received from duty ratio calculation portion 114 for turning on and off power transistors Q1 and Q2 of upconverter 10 and outputs the generated signal PWC to power transistors Q1 and Q2 of upconverter 10.

Figure 4:
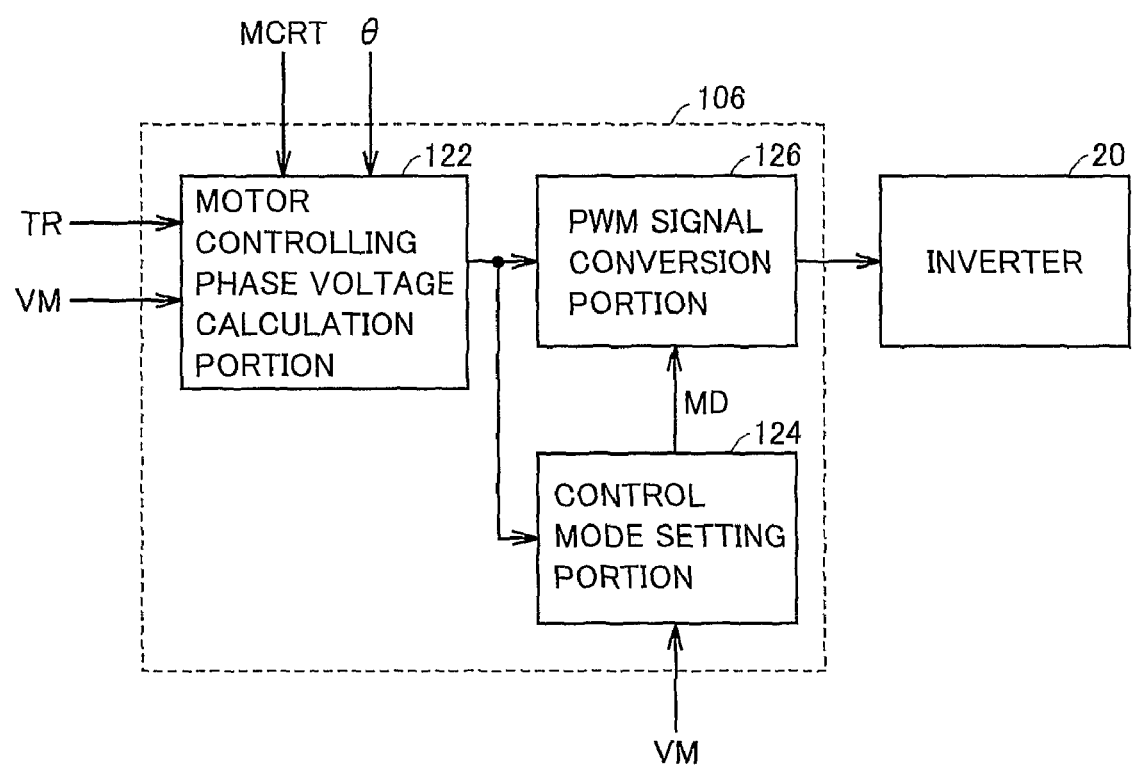
FIG. 4 is a functional block diagram specifically showing the inverter control portion shown in FIG. 2.

FIG. 4 is a functional block diagram specifically showing inverter control portion 106 shown in FIG. 2. With reference to FIG. 4, inverter control portion 106 includes a motor controlling phase voltage calculation portion 122, a control mode setting portion 124, and a PWM signal conversion portion 126.

Motor controlling phase voltage calculation portion 122 calculates, as based on torque control value TR received from torque control value generation portion 102 (not shown), motor current MCRT, voltage VM received from voltage sensor 44 and position $\theta$ received from position sensor 46, voltages applied to the U-, V-, and W-phase coils, respectively, of motor generator MG and outputs the voltages calculated for the U-, V-, and W-phase coils to control mode setting portion 124 and PWM signal conversion portion 126.

Control mode setting portion 124 calculates, as based on the voltages applied to the phase coils as received from motor controlling phase voltage calculation portion 122 and voltage VM, a modulation ratio of the voltage applied to each phase coil relative to voltage VM (i.e., a ratio of the voltage applied to each coil to voltage VM). Then, control mode setting portion 124 sets, as based on the calculated modulation ratio, a control mode for motor generator MG and outputs a signal MD indicative of the set control mode to PWM signal conversion portion 126.

More specifically, inverter 20 controls motor generator MG in one of a PWM control mode and a rectangular-wave control mode. The rectangular-wave control mode is a control mode controlling an output waveform to be a rectangular wave in order to increase voltage utilization to be higher than the PWM control mode, which controls an output waveform to be a sine wave. For a modulation ratio equal to or smaller than a predetermined constant, control mode setting portion 124 sets the current mode to be the PWM control mode, and when the modulation ratio exceeds the constant, control mode setting portion 124 sets the current control mode to be the rectangular-wave control mode.

Note that the rectangular-wave control mode is switched in a period longer than the PWM control mode and is predicated on that the inverter receives constant voltage. As such, if voltage VM (i.e., the voltage input to the inverter) abruptly varies, the switching operation in inverter 20 cannot follow the abrupt variation in voltage VM, and motor generator MG is thus unstably controlled. Note that an over-modulation control mode may be provided as a control mode intermediate between the PWM control mode and the rectangular-wave control mode.

PWM signal conversion portion 126 in a control mode indicated by signal MD received from control mode setting portion 124 operates in accordance with a voltage control value for each phase coil as received from motor controlling phase voltage calculation portion 122 to generate signal PWM turning on and off power transistors Q11-Q16 of inverter 20 and output the generated signal PWM to power transistors Q11-Q16 of inverter 20.

Figure 5:
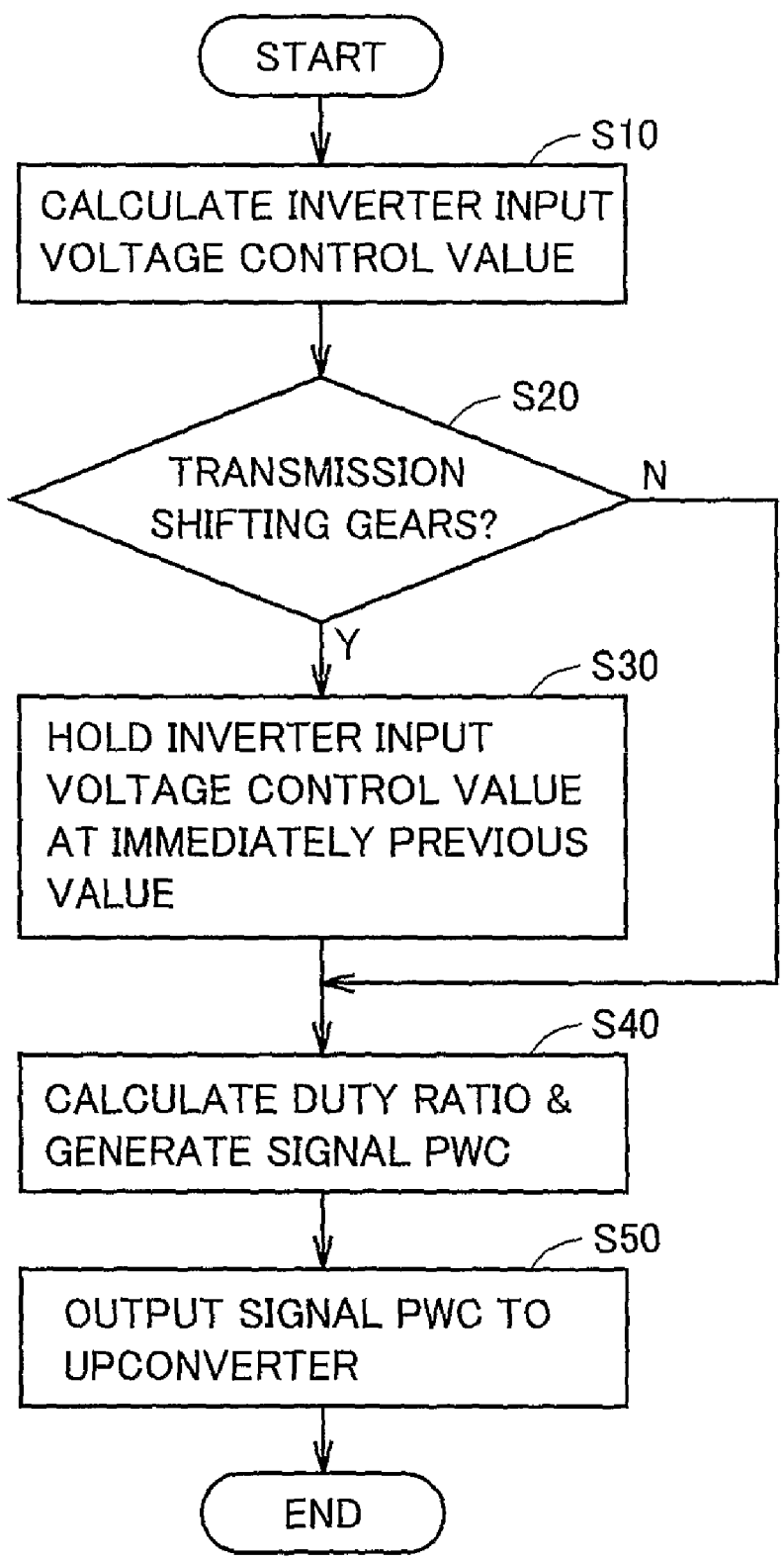
FIG. 5 is a flow chart for illustrating an operation of the converter control portion shown in FIG. 2.

FIG. 5 is a flow chart for illustrating an operation of converter control portion 104 shown in FIG. 2. Note that the series of process steps flowing as shown in FIG. 5 is performed repeatedly in a predetermined controlling period. With reference to FIG. 5, converter control portion 104 calculates inverter input voltage control value Vcom as based on torque control value TR and a motor rotation speed calculated from position $\theta$ received from position sensor 46 (step S10). Then converter control portion 104 determines, as based on transmission signal TS received from transmission TM, whether transmission TM is currently shifting gears (step S20). If not (NO at step S20), converter control portion 104 proceeds to step S40.

If converter control portion 104 determines that transmission TM is currently shifting gears (YES at step S20), converter control portion 104 does not update inverter input voltage control value Vcom with the value calculated at step S10 and instead holds it at the immediately previously calculated value (step S30). In other words, when transmission TM is shifting gears, inverter input voltage control value Vcom is fixed at a value assumed when transmission TM starts to shift gears.

Then, converter control portion 104 calculates a duty ratio, as based on inverter input voltage control value Vcom and voltages VB and VM received from voltage sensors 42 and 44, for controlling a voltage input to inverter 20 to be inverter input voltage control value Vcom, and as based on the calculated duty ratio, converter control portion 104 generates signal PWC (step S40). Converter control portion 104 then outputs the generated signal PWC to power transistors Q1 and Q2 of upconverter 10 (step S50).

Figure 6:
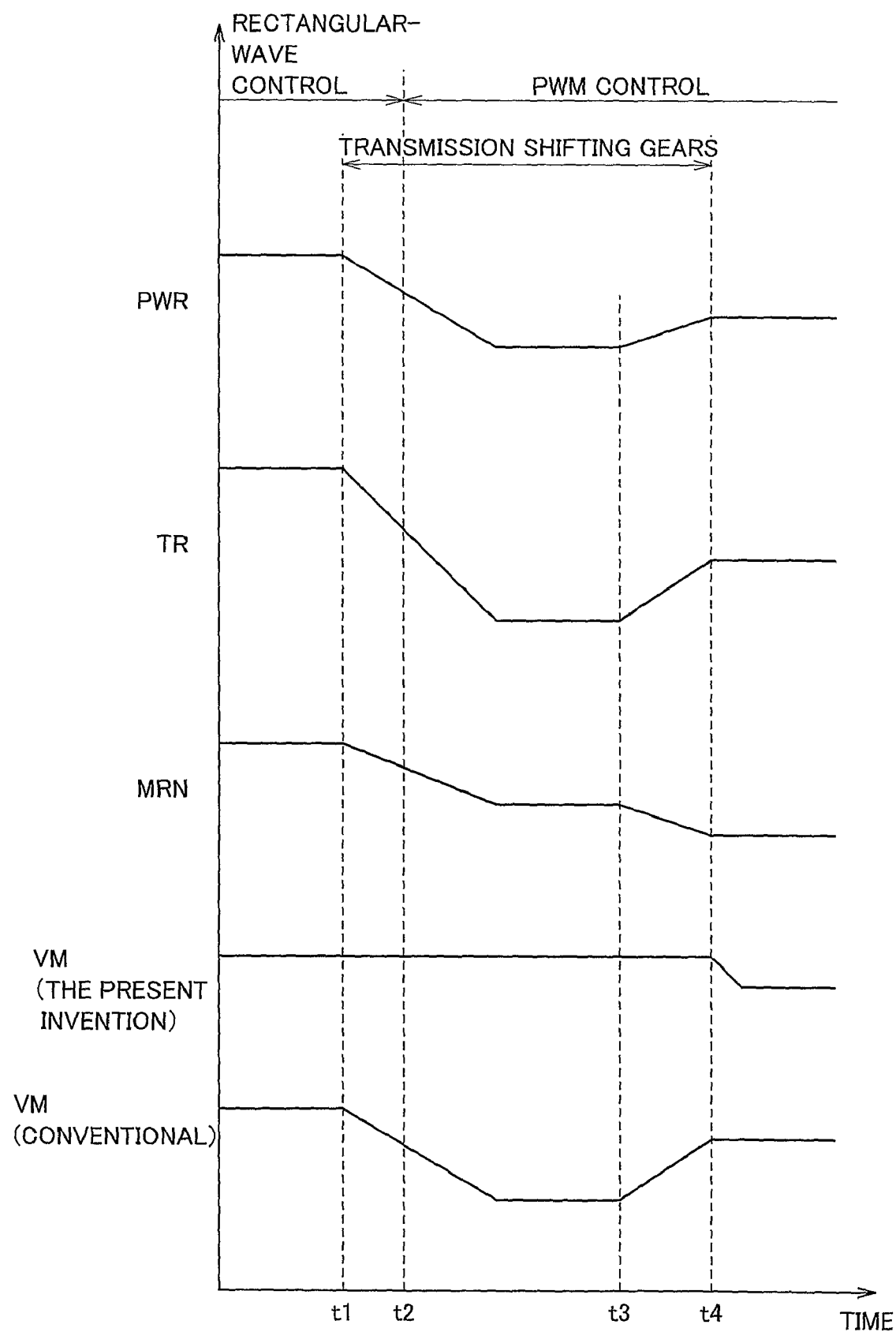
FIG. 6 is timing plots for illustrating an operation of a motored vehicle in the first embodiment.

FIG. 6 is timing plots for illustrating an operation of motored vehicle 100 in the first embodiment. With reference to FIG. 6, at time t1 transmission TM starts to shift gears. In response, torque control value TR for motor generator MG starts to decrease and accordingly the output PWR and rotation speed MRN of motor generator MG also decrease. As torque control value TR decreases, motor generator MG decreases in phase voltage and accordingly the current modulation ratio decreases. Thus at time t2 the current control mode is switched from the rectangular-wave control mode to the PWM mode control mode.

Then, in the later half of shifting gears when time t3 is reached, torque control value TR for motor generator MG starts to increase (or recover), and at time t4, transmission TM completes shifting gears.

Herein if the variation in voltage VM is not limited when transmission TM is shifting gears, as is done conventionally, voltage VM varies as torque control value TR varies, since converter control portion 104 generates inverter input voltage control value Vcom based on torque control value TR for motor generator MG. As such, inverter 20 is controlled unstably from time t1 to time t2, for which period motor generator MG is controlled in the rectangular-wave control mode predicated on that the inverter receives constant voltage.

In the first embodiment, however, for time t1 to time t4, i.e., when transmission TM is shifting gears, converter control portion 104 fixes inverter input voltage control value Vcom at a value assumed when transmission TM starts to shift gears. Accordingly, voltage VM, i.e., the voltage input to the inverter is controlled to have a constant value. Thus motor generator MG can also be stably controlled from time t1 to time t2 for which period the rectangular-wave control mode is set.

Thus in accordance with the first embodiment when transmission TM is shifting gears voltage VM can be controlled to have a constant value. As such, if motor generator MG is controlled in the rectangular-wave control mode, motor generator MG will not be controlled unstably. Motor generator MG can thus be controlled stably.

Second Embodiment

In the first embodiment when transmission TM is shifting gears the voltage output from upconverter 10 is fixed. In the second embodiment the voltage output from upconverter 10 is allowed to increase. In other words, in the second embodiment, when transmission TM is shifting gears, the voltage output from upconverter 10 is controlled to be prevented from decreasing. This, as well as the first embodiment, can prevent motor generator MG from being unstably controlled in the former half of shifting gears as motor generator MG decreases in torque and voltage VM accordingly varies (or decreases), and furthermore prevent motor generator MG from being unstably controlled when transmission TM completes shifting gears and the current control mode is the rectangular-wave control mode, and voltage VM fixed is liberated and thus increases.

The second embodiment provides a motored vehicle 100A, which is different from motored vehicle 100 of the first embodiment in the function of the converter control portion. Motored vehicle 100A of the second embodiment has the remainder identical in configuration to motored vehicle 100 of the first embodiment.

Figure 7:
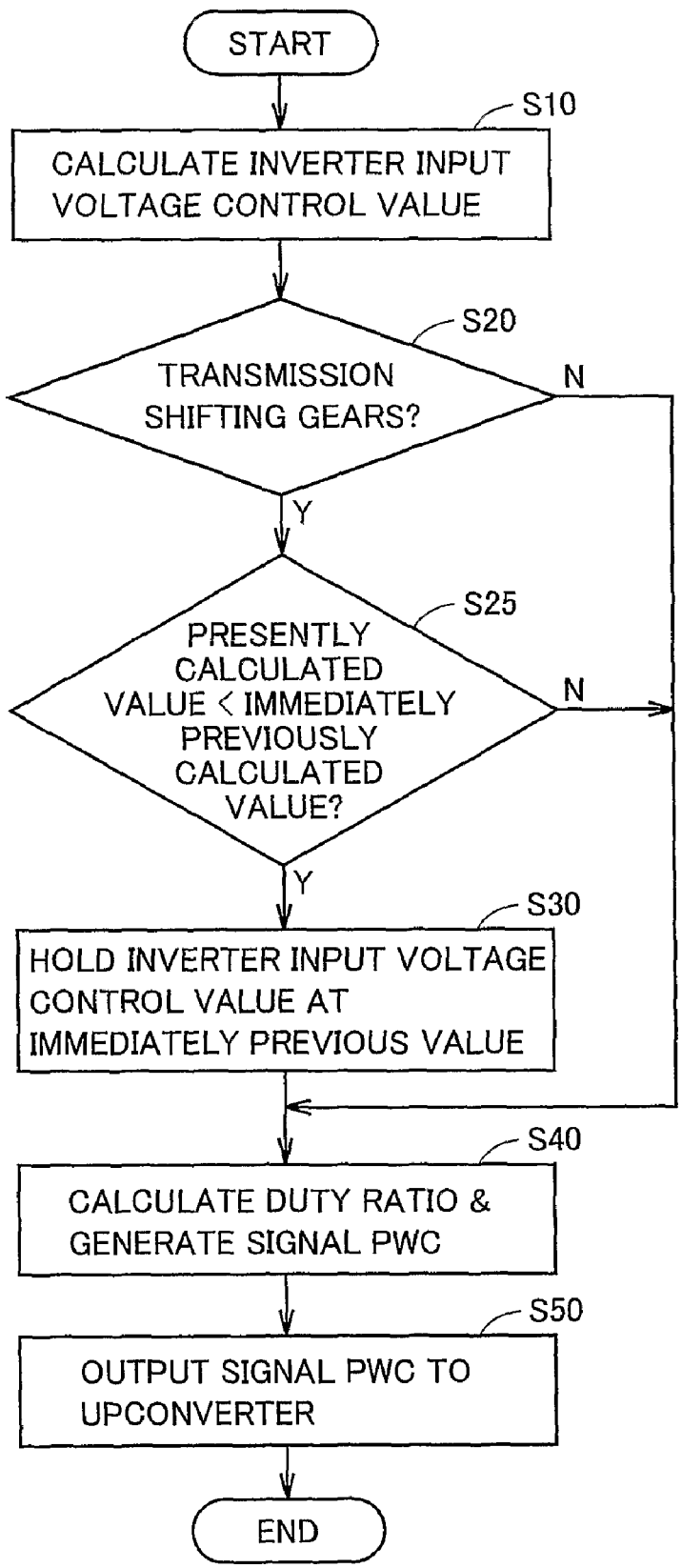
FIG. 7 is a flow chart for illustrating an operation of a converter control portion in a motored vehicle in a second embodiment.

FIG. 7 is a flow chart for illustrating an operation of a converter control portion 104A in motored vehicle 100A of the second embodiment. Note that the series of process steps flowing as shown in FIG. 7 is performed repeatedly in a predetermined controlling period. With reference to FIG. 7, this flow of the process corresponds to that for converter control portion 104 described in the first embodiment with reference to FIG. 5 plus step S25.

More specifically, if in step S20 a determination is made that transmission TM is shifting gears (YES at step S20), converter control portion 104A determines whether inverter input voltage control value Vcom calculated at step S10 is smaller than the immediately previously calculated value (step S25). If so (YES at step S25), converter control portion 104A proceeds to step S30, otherwise (NO at step S25) proceeds to step S40. More specifically, when transmission TM is shifting gears, converter control portion 104A controls inverter input voltage control value Vcom to prevent inverter input voltage control value Vcom from decreasing and allows inverter input voltage control value Vcom to increase.

Figure 8:
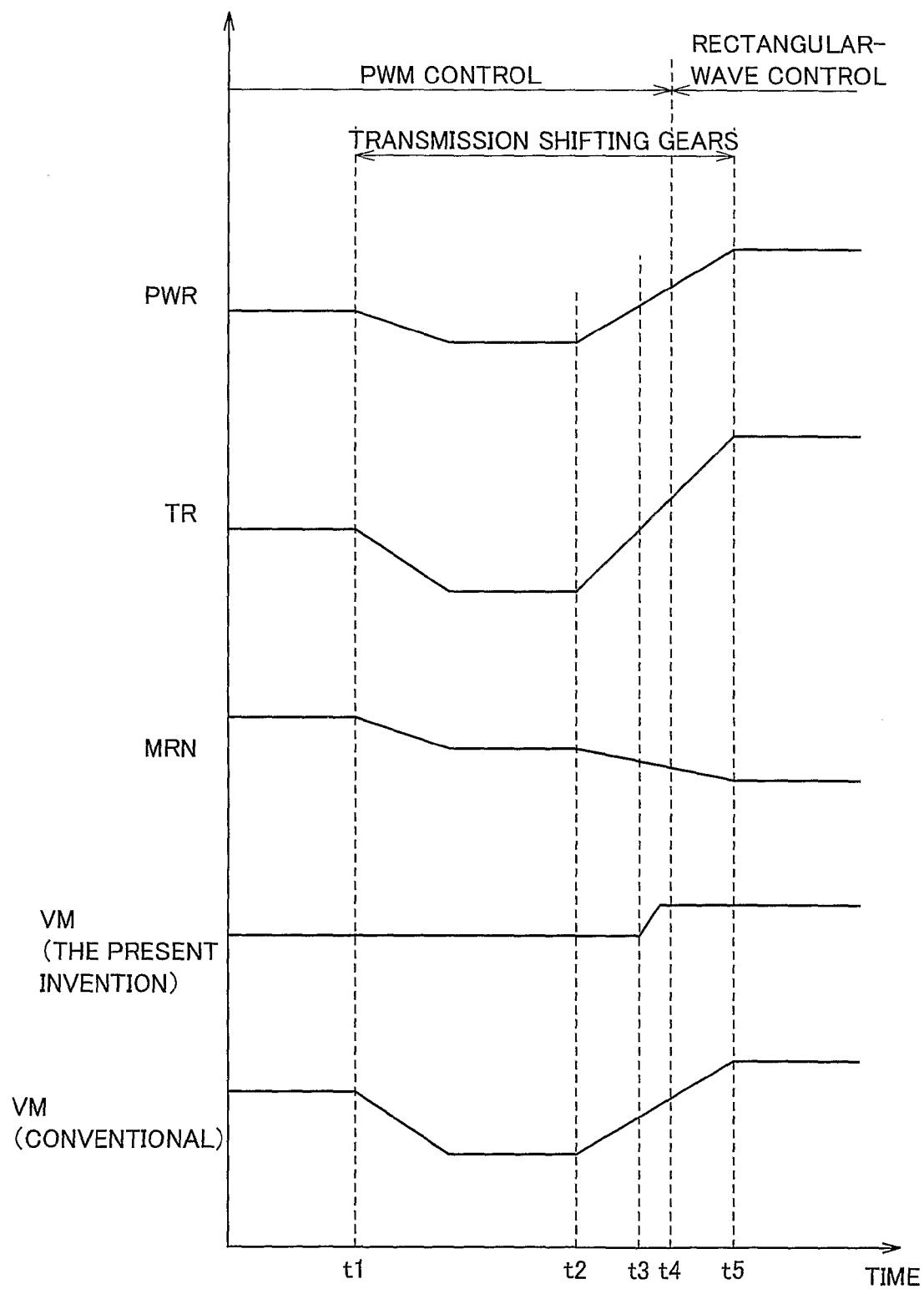
FIG. 8 is timing plots for illustrating an operation of the motored vehicle in the second embodiment.

FIG. 8 is timing plots for illustrating an operation of motored vehicle 100A of the second embodiment. With reference to FIG. 8, at time t1 transmission TM starts to shift gears. In response, torque control value TR for motor generator MG starts to decrease and accordingly the output PWR and rotation speed MRN of motor generator MG also decrease.

Then, in the later half of shifting gears when time t2 is reached, torque control value TR for motor generator MG starts to increase (or recover), and as torque control value TR increases, at time t3 the voltage output from upconverter 10, i.e., voltage VM increases. It should be noted, however, that at this temporal point, the current control mode is the PWM control mode. As such, if voltage VM varies, motor generator MG will not be controlled unstably.

When torque control value TR for motor generator MG further increases, motor generator MG increases in phase voltage and accordingly the current modulation ratio increases. As such, when time t4 is reached, the current control mode is switched from the PWM control mode to the rectangular-wave control mode. At time t4, however, the increase of voltage VM has completed. As such, if the current control mode is switched to the rectangular-wave control mode, motor generator MG will not be controlled unstably, and at time t5, transmission TM completes shifting gears.

Herein if the variation in voltage VM is not limited when transmission TM is shifting gears, as is done conventionally, voltage VM also increases after the current control mode is switched from the PWM control mode to the rectangular-wave control mode, i.e., after time t4, as torque control value TR for motor generator MG increases (or recovers), since converter control portion 104A calculates inverter input voltage control value Vcom based on torque control value TR for motor generator MG. Thus from time t4 to time t5 the control by inverter 20 is unstable. The second embodiment can avoid such situation, as has been described above.

Furthermore, if voltage VM is fixed when transmission TM is shifting gears, then when transmission TM completes shifting gears, i.e., at time t5, the voltage VM fixed is liberated and thus increases, while the current control mode is the rectangular-wave control mode and accordingly, motor generator MG is controlled unstably. The second embodiment can avoid such situation as voltage VM is allowed to increase when the current control mode is switched from the PWM control mode to the rectangular-wave control mode as transmission TM shifts gears.

Note that in the above description the voltage output from upconverter 10 is controlled to be prevented from decreasing when transmission TM is shifting gears. Alternatively, the voltage output from upconverter 10 may be prohibited from decreasing when transmission TM is shifting gears.

Thus in accordance with the second embodiment voltage VM is allowed to increase even when the transmission is shifting gears. As such, motor generator MG will not be controlled unstably in the latter half of shifting gears when a torque recovers and the current control mode is switched from the PWM control mode to the rectangular-wave control mode. Motor generator MG can thus be controlled stably.

Third Embodiment

In the third embodiment when transmission TM starts to shift gears the voltage output from upconverter 10 is increased to a controllable, maximum voltage, and when transmission TM is shifting gears, the voltage output from upconverter 10 is fixed at that maximum voltage. More specifically, while in the second embodiment voltage VM is increased in the latter half of shifting gears as torque control value TR for motor generator MG increases (or recovers), in the third embodiment voltage VM is increased previously when transmission TM starts to shift gears.

The third embodiment provides a motored vehicle 100B different from motored vehicle 100 of the first embodiment in the function of the converter control portion. Motored vehicle 100B of the third embodiment has the remainder identical in configuration to that of motored vehicle 100 of the first embodiment.

Figure 9:
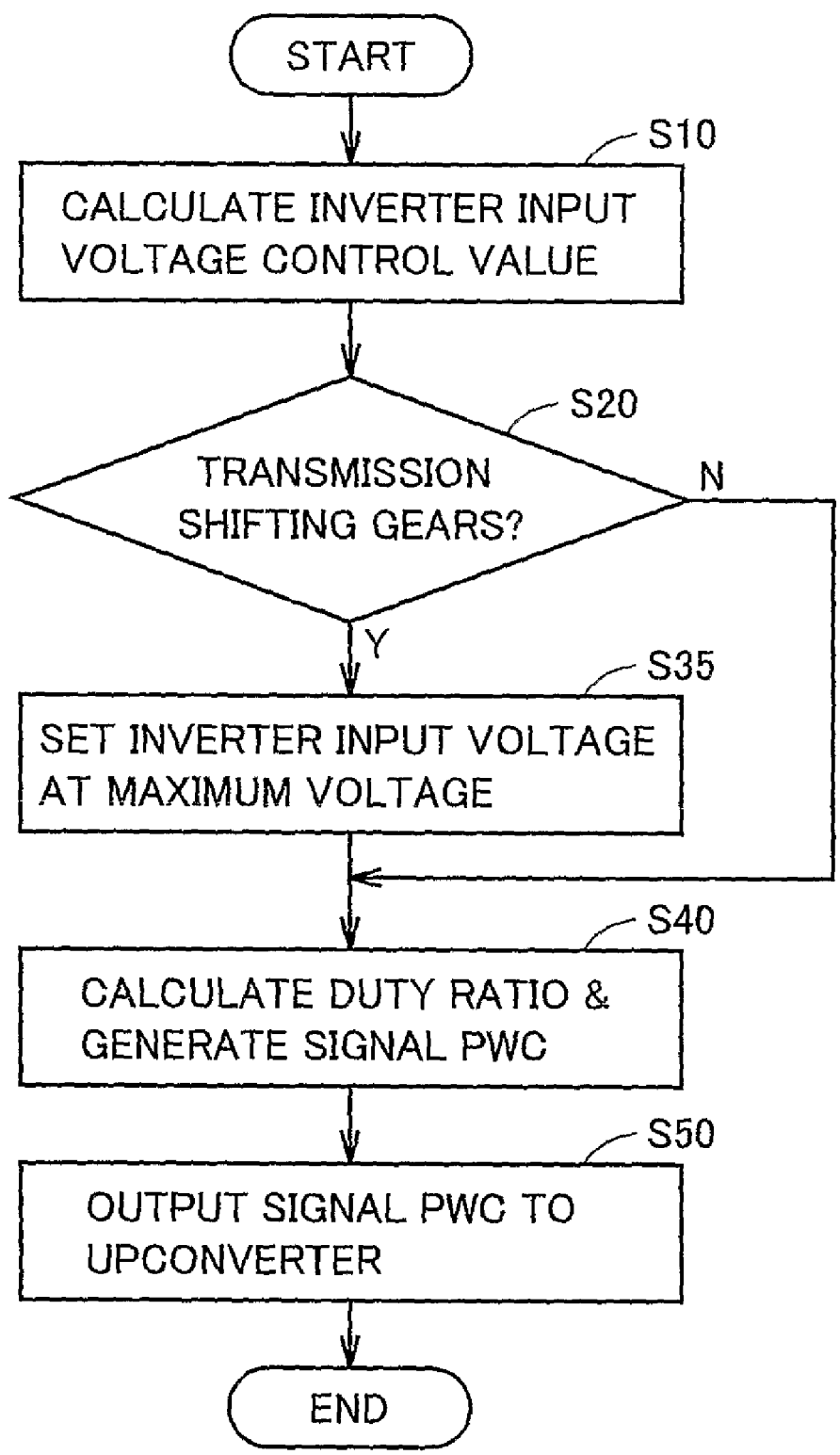
FIG. 9 is a flow chart for illustrating an operation of a converter control portion in a motored vehicle in a third embodiment.

FIG. 9 is a flow chart for illustrating an operation of a converter control portion 104B in motored vehicle 100B of the third embodiment. Note that the series of process steps flowing as shown in FIG. 9 is performed repeatedly in a predetermined controlling period. With reference to FIG. 9, this flow of the process corresponds to that for converter control portion 104 described in the first embodiment with reference to FIG. 5 having step S30 replaced with step S35.

More specifically, if in step S20 a determination is made that transmission TM is shifting gears (YES at step S20), then, regardless of the value of inverter input voltage control value Vcom calculated at step S10, converter control portion 104B sets inverter input voltage control value Vcom at a maximum voltage controllable by upconverter 10 (step S35). More specifically, when transmission TM is shifting gears, converter control portion 104B fixes inverter input voltage control value Vcom at the maximum voltage controllable by upconverter 10.

Figure 10:
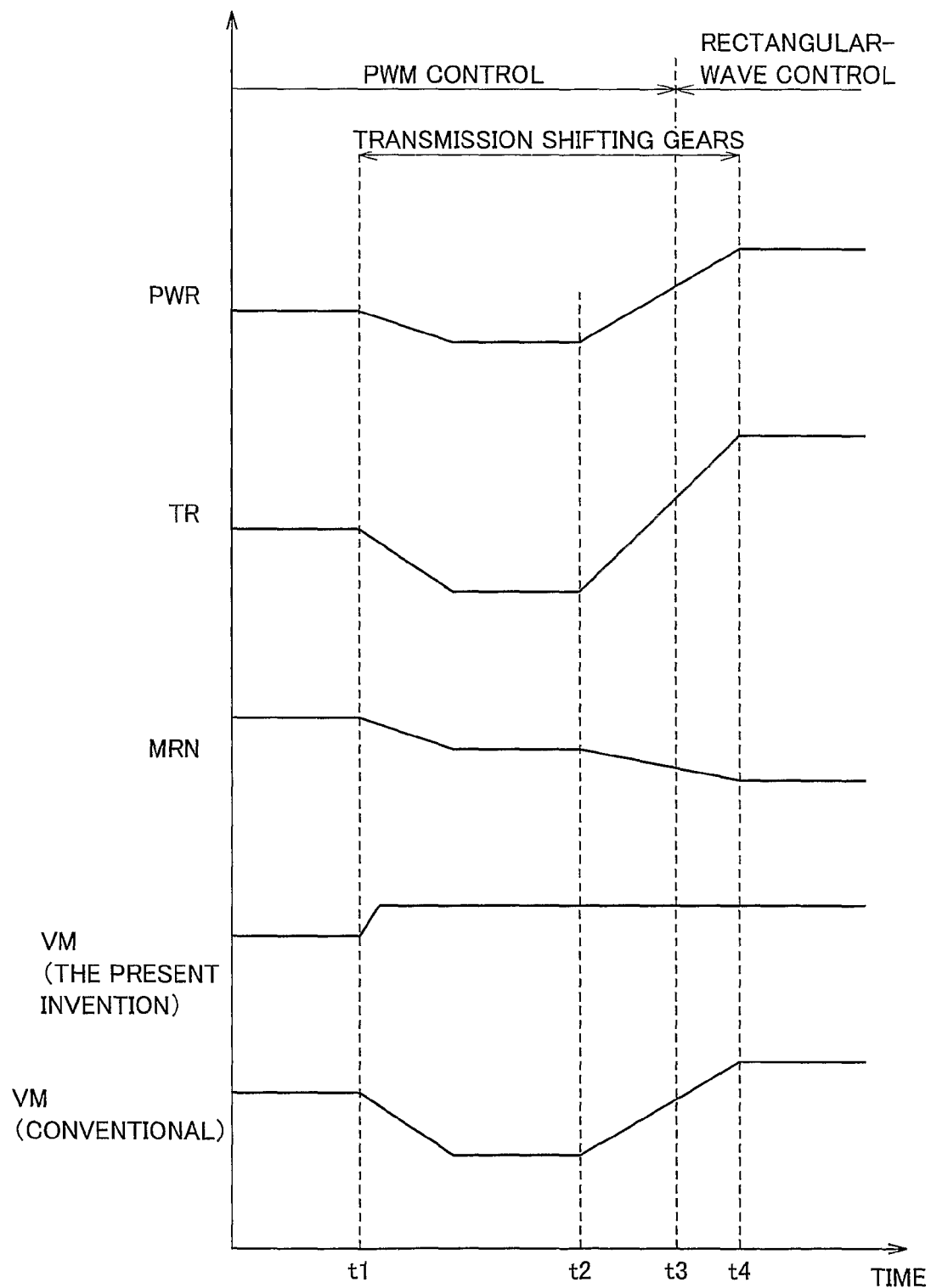
FIG. 10 is timing plots for illustrating an operation of the motored vehicle in the third embodiment.

FIG. 10 is timing plots for illustrating an operation of motored vehicle 100B of the third embodiment. With reference to FIG. 10, at time t1 transmission TM starts to shift gears. In response, torque control value TR for motor generator MG starts to decrease and accordingly the output PWR and rotation speed MRN of motor generator MG also decrease. Furthermore, the voltage output from upconverter 10, i.e., voltage VM, increases to the controllable, maximum voltage.

In the latter half of shifting gears when time t2 is reached, torque control value TR for motor generator MG starts to increase (or recover), and as torque control value TR increases, at time t3 the current control mode is switched from the PWM control mode to the rectangular-wave control mode. However, when transmission TM is shifting gears, voltage VM is controlled to be the controllable, maximum voltage. As such, if at time t3 the current control mode is switched to the rectangular-wave control mode, motor generator MG will not be controlled unstably, and at time t4 transmission TM completes shifting gears.

In contrast, if the variation in voltage VM is not limited when transmission TM is shifting gears, as is done conventionally, then the control by inverter 20 can be unstable, as has been described in the first and second embodiments.

Thus in the third embodiment when transmission TM is shifting gears voltage VM can be fixed at a controllable, maximum voltage. As such, if the current mode is the rectangular-wave control mode, motor generator MG will not be controlled unstably. Motor generator MG can thus be controlled stably.

Note that while in the above first to third embodiments motored vehicles 100, 100A and 100B have been described as having a single motor generator MG mounted thereon, the present invention is not limited thereto and a plurality of motor generators may be mounted. More specifically, the present invention is also applicable to a hybrid vehicle including another motor generator linked to an engine via a power split device, and another inverter connected to power supply line PL2 and ground line SL and driving the other motor generator.

Furthermore, while in the above description transmission TM has been described as a transmission having a friction element re-engaged in accordance with the gear of interest, the present invention is also applicable to a transmission formed of a clutch and a constantly meshed gear.

Note that in the above description, upconverter 10 corresponds in the present invention to an "upconverter" and inverter 20 corresponds in the present invention to a "drive device." Furthermore, converter control portions 104, 104A and 104B correspond in the present invention to an "up-conversion control portion" and torque control value generation portion 102 and inverter control portion 106 correspond in the present invention to a "torque control portion." Furthermore, upconverter 10, inverter 20 and ECU 30 configure a "load drive apparatus" in the present invention.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:

1. A load drive apparatus of a motored vehicle having a transmission between a motor generating force driving said vehicle and a driving wheel of said vehicle, comprising:
   a drive device that drives said motor;
   an upconverter that receives a direct current voltage from a battery and upconverts the direct current voltage to an upconverted voltage and supplies the upconverted voltage to said drive device; and
   an up-conversion control portion that sets a target upconverted voltage based on an output of said motor, and that controls said upconverter to supply said target upconverted voltage, wherein
   said up-conversion control portion sets said target upconverted voltage at a constant value regardless of variation in the output of said motor when said transmission is shifting gears.

2. The load drive apparatus according to claim 1, wherein said up-conversion control portion sets said target upconverted voltage when said transmission is shifting gears, said upconverted voltage being an upconverted voltage assumed when said transmission starts to shift gears.

3. The load drive apparatus according to claim 1, wherein said drive device has a rectangular-wave control mode as a control mode applied to control said motor.

4. A motored vehicle comprising:
   a motor generating force driving the vehicle;
   a transmission provided between said motor and a driving wheel of the vehicle; and
   the load drive apparatus according to claim 1.

5. A load drive apparatus of a motored vehicle having a transmission between a motor generating force driving said vehicle and a driving wheel of said vehicle, comprising:
   a drive device that drives said motor;
   an upconverter that receives a direct current voltage from a battery and upconverts the direct current voltage to an upconverted voltage and supplies the upconverted voltage to said drive device;
   an up-conversion control portion that sets a target upconverted voltage based on an output of said motor, and that controls said upconverter to supply said target upconverted voltage; and
   a torque control portion that controls said drive device to reduce a torque output of said motor when said transmission is shifting gears, wherein
   said up-conversion control portion controls said upconverter to prevent said up-converted voltage from decreasing when said transmission is shifting gears as said torque control portion reduces the torque output of said motor, and said up-conversion control portion sets said target upconverted voltage at a constant value when said transmission is shifting gears.

6. The load drive apparatus according to claim 5, wherein said up-conversion control portion sets said target upconverted voltage when said transmission is shifting gears, said upconverted voltage being an upconverted voltage assumed when said transmission starts to shift gears.

7. The load drive apparatus according to claim 5, wherein said up-conversion control portion sets said target upconverted voltage when said transmission is shifting gears, said upconverted voltage being a controllable, maximum voltage.

8. The load drive apparatus according to claim 5, wherein said drive device has a rectangular-wave control mode as a control mode applied to control said motor.

9. The load drive apparatus according to claim 5, wherein said up-conversion control portion permits the upconverted voltage to increase when the torque output of said motor recovers.

10. A load drive apparatus of a motored vehicle having a transmission between a motor generating force driving said vehicle and a driving wheel of said vehicle, comprising:
a drive device that drives said motor;
an upconverter that receives a direct current voltage from a battery and upconverts the direct current voltage to an upconverted voltage and supplies the upconverted voltage to said drive device; and
up-conversion control means that sets a target upconverted voltage based on an output of said motor, and that controls said upconverter to supply said target upconverted voltage, wherein
said up-conversion control means sets said target upconverted voltage at a constant value regardless of variation in the output of said motor when said transmission is shifting gears.

11. The load drive apparatus according to claim 10, wherein said up-conversion control means sets said target upconverted voltage when said transmission is shifting gears, said upconverted voltage being an upconverted voltage assumed when said transmission starts to shift gears.

12. The load drive apparatus according to claim 10, wherein said drive device has a rectangular-wave control mode as a control mode applied to control said motor.

13. A load drive apparatus of a motored vehicle having a transmission between a motor generating force driving said vehicle and a driving wheel of said vehicle, comprising:
a drive device that drives said motor;
an upconverter that receives a direct current voltage from a battery and upconverts the direct current voltage to an upconverted voltage and supplies the upconverted voltage to said drive device;
up-conversion control means said that sets a target upconverted voltage based on an output of said motor, and that controls said upconverter to supply said target upconverted voltage; and
torque control means that controls said drive device to reduce a torque output of said motor when said transmission is shifting gears, wherein
said up-conversion control means controls said upconverter to prevent said up-converted voltage from decreasing when said transmission is shifting gears as said torque control means reduces the torque output of said motor, and said up-conversion control means sets said target upconverted voltage at a constant value when said transmission is shifting gears.

14. The load drive apparatus according to claim 13, wherein said up-conversion control means sets said target upconverted voltage when said transmission is shifting gears, said upconverted voltage being an upconverted voltage assumed when said transmission starts to shift gears.

15. The load drive apparatus according to claim 13, wherein said up-conversion control means sets said target upconverted voltage when said transmission is shifting gears, said upconverted voltage being a controllable, maximum voltage.

16. The load drive apparatus according to claim 13, wherein said drive device has a rectangular-wave control mode as a control mode applied to control said motor.

17. The load drive apparatus according to claim 13, wherein said up-conversion control means permits the upconverted voltage to increase when the torque output of said motor recovers.

* * * * *